(12) United States Patent
Hung et al.

(10) Patent No.: US 9,692,347 B2
(45) Date of Patent: Jun. 27, 2017

(54) AIRFLOW-CONFIRMING HVAC SYSTEMS AND METHODS WITH VARIABLE SPEED BLOWER

(71) Applicant: Lennox Industries Inc., Richardson, TX (US)

(72) Inventors: Der-Kai Hung, Dallas, TX (US); Harold Gene Havard, Jr., Carrollton, TX (US); Rosa Maria Leal, Irving, TX (US); Steven C. Brown, The Colony, TX (US); Stephen A. Walter, Flower Mound, TX (US)

(73) Assignee: Lennox Industries Inc., Richardson, TX (US)

( * ) Notice: Subject to any disclaimer, the term of this patent is extended or adjusted under 35 U.S.C. 154(b) by 519 days.

(21) Appl. No.: 14/304,873

(22) Filed: Jun. 13, 2014

(65) Prior Publication Data
US 2015/0362205 A1 Dec. 17, 2015

(51) Int. Cl.
| | | |
|---|---|---|
| *H02P 29/00* | (2016.01) | |
| *H02P 29/10* | (2016.01) | |
| *F25B 49/02* | (2006.01) | |
| *F24F 11/00* | (2006.01) | |
| *H02P 23/16* | (2016.01) | |
| *H02P 23/02* | (2006.01) | |
| *F24F 11/04* | (2006.01) | |

(52) U.S. Cl.
CPC ...... *H02P 29/0011* (2013.01); *F24F 11/0012* (2013.01); *F24F 11/0079* (2013.01); *F25B 49/02* (2013.01); *H02P 23/16* (2016.02); *H02P 29/10* (2016.02); *Y02B 30/746* (2013.01)

(58) Field of Classification Search
CPC ....... H02P 29/10; H02P 23/16; F24F 11/0079; F24F 2011/0042; F25B 49/02; Y02B 30/746

USPC ........... 454/238, 239, 233, 255, 340, 236; 700/206, 301
IPC ....................... H02P 29/00,23/02; F24F 11/04
See application file for complete search history.

(56) References Cited

U.S. PATENT DOCUMENTS

| | | | | |
|---|---|---|---|---|
| 1,956,829 | A * | 5/1934 | Frank ................... | F04D 29/464 415/150 |
| 2,117,477 | A * | 5/1938 | Hall ....................... | F24F 11/025 138/46 |
| 2,549,672 | A * | 4/1951 | Del Mar ............... | B64D 13/04 454/74 |
| 3,402,654 | A * | 9/1968 | Berst ..................... | F24F 7/08 236/49.4 |
| 3,518,814 | A * | 7/1970 | Maynard ............... | B25H 1/20 417/43 |
| 4,086,781 | A * | 5/1978 | Brody ................... | F24F 11/04 165/250 |
| 5,172,565 | A * | 12/1992 | Wruck ................... | F24F 3/06 236/49.3 |

(Continued)

*Primary Examiner* — Gregory Huson
*Assistant Examiner* — Daniel E Namay
(74) *Attorney, Agent, or Firm* — Hubbard Johnston, PLLC (57) ABSTRACT

Systems and methods involve controlling a variable-speed blower in a heating, ventilating, and air conditioning (HVAC) system to ensure the setting of a blower-proving switch to confirm airflow in a building. In one instance, a method involves ramping up the variable-speed blower so that the associated static pressure reaches a making point pressure of the blower-proving switch and then reducing the power to a desired power level. The method may also include maintaining the power level above a breaking point pressure. Other systems and methods are presented.

14 Claims, 5 Drawing Sheets

(56) References Cited

U.S. PATENT DOCUMENTS

| | | | | | |
|---|---|---|---|---|---|
| 5,538,471 | A * | 7/1996 | Guiles, Jr. | F24F 11/0079 | 454/238 |
| 5,705,734 | A * | 1/1998 | Ahmed | F24F 11/0001 | 454/256 |
| 5,791,408 | A * | 8/1998 | Seem | F24F 11/0076 | 165/248 |
| 5,863,246 | A * | 1/1999 | Bujak, Jr. | F24F 3/0442 | 165/212 |
| 5,931,227 | A * | 8/1999 | Graves | F24F 3/0442 | 165/216 |
| 8,326,464 | B2 * | 12/2012 | Clanin | F24F 11/0001 | 454/228 |
| 2005/0006488 | A1 * | 1/2005 | Stanimirovic | F24F 11/0086 | 236/49.1 |
| 2006/0116067 | A1 * | 6/2006 | Federspiel | F24F 11/0001 | 454/256 |
| 2007/0032187 | A1 * | 2/2007 | Liu | F24F 11/0001 | 454/186 |
| 2007/0093194 | A1 * | 4/2007 | Dinescu | B60H 1/24 | 454/121 |
| 2008/0045132 | A1 * | 2/2008 | Livchak | F24C 15/2021 | 454/61 |
| 2008/0139105 | A1 * | 6/2008 | Kuentz | F24F 11/0079 | 454/238 |
| 2008/0160901 | A1 * | 7/2008 | Stanimirovic | F24F 11/0086 | 454/239 |
| 2009/0247064 | A1 * | 10/2009 | Chen | F24F 11/0079 | 454/239 |
| 2010/0057258 | A1 * | 3/2010 | Clanin | F24F 11/0001 | 700/276 |
| 2010/0076606 | A1 * | 3/2010 | Gatley | F04D 27/004 | 700/276 |
| 2011/0053488 | A1 * | 3/2011 | Gans | B08B 15/002 | 454/343 |
| 2011/0070818 | A1 * | 3/2011 | Goel | F24F 11/0079 | 454/255 |
| 2013/0040548 | A1 * | 2/2013 | Mannion, Jr. | F24F 11/04 | 454/230 |
| 2013/0087319 | A1 * | 4/2013 | Havard | F04D 27/004 | 165/244 |
| 2014/0134938 | A1 * | 5/2014 | Hatton | F24F 7/06 | 454/239 |
| 2014/0323030 | A1 * | 10/2014 | Rugge | F24F 11/04 | 454/256 |
| 2015/0354845 | A1 * | 12/2015 | Brown | F24F 13/10 | 165/237 |

* cited by examiner

AIRFLOW-CONFIRMING HVAC SYSTEMS AND METHODS WITH VARIABLE SPEED BLOWER

FIELD

This application is directed, in general, to heating, ventilating and air conditioning or cooling (HVAC) systems, and more specifically, to methods and systems involving HVAC systems having a variable speed blower that confirm airflow within the system.

BACKGROUND

Heating, ventilating, and air conditioning (HVAC) systems can be used to regulate the environment within an enclosed space. Typically, an air blower is used to pull air (i.e., return air) from the enclosed space into the HVAC system through ducts and push the air into the enclosed space through additional ducts after conditioning the air (e.g., heating, cooling or dehumidifying the air). Unless otherwise indicated, as used throughout this document, "or" does not require mutual exclusivity. Various types of HVAC systems may be used to provide conditioned air for enclosed spaces.

BRIEF DESCRIPTION

Illustrative embodiments of the present invention are described in detail below with reference to the attached drawing figures, which are incorporated by reference herein and wherein.

DETAILED DESCRIPTION

In the following detailed description of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the claims.

Figure 1:
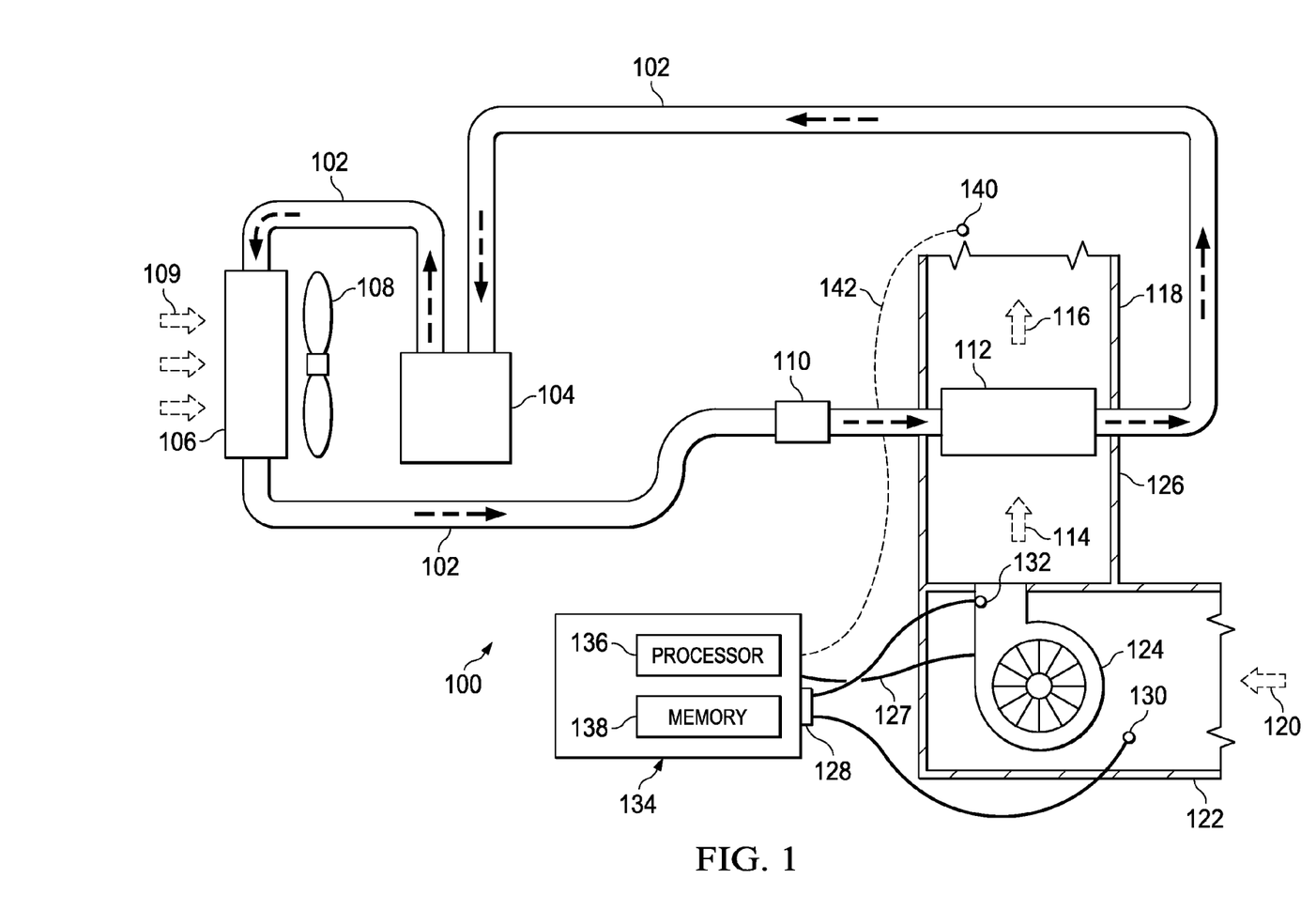
FIG. 1 is a schematic diagram of an HVAC system according to an illustrative embodiment.
Figure 2:
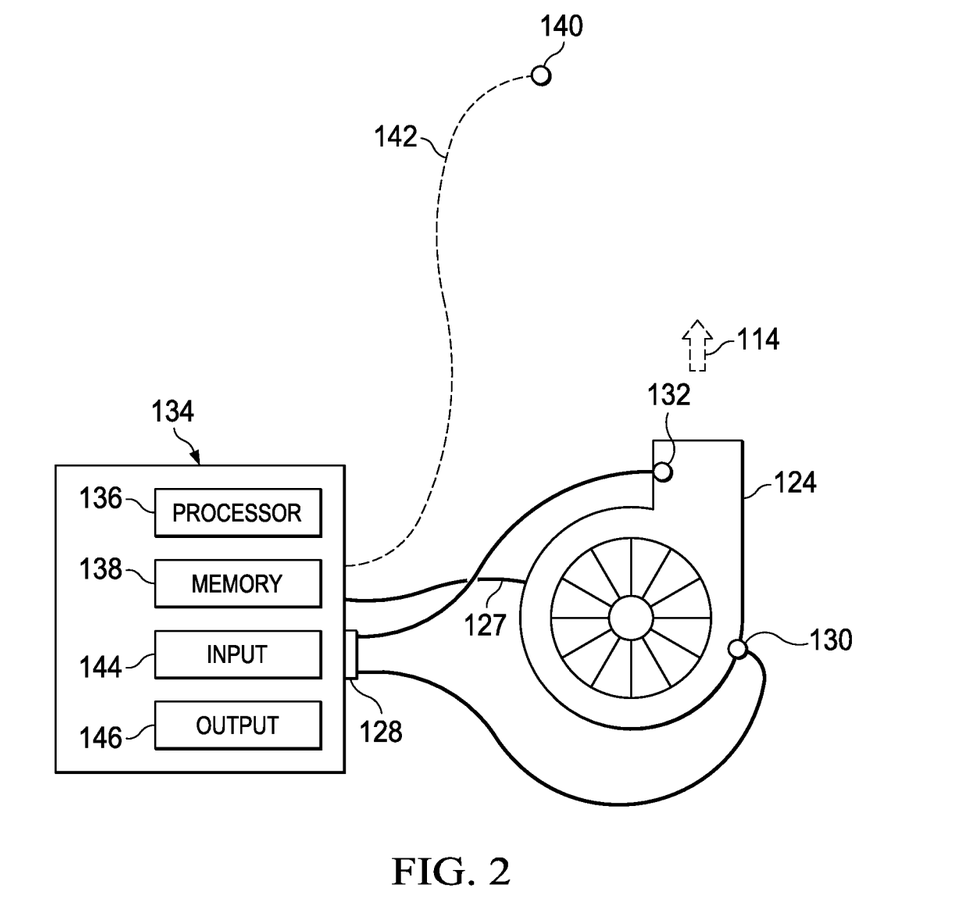
FIG. 2 is a schematic diagram of variable speed blower with processing unit and blower-proving switch according to an illustrative embodiment.

Referring now primarily to FIGS. 1 and 2, a heating, ventilating, and air conditioning (HVAC) system 100 is presented. The HVAC system 100 conditions air for delivery to an interior space of a building. In some embodiments, the HVAC system 100 is a rooftop unit (RTU) that is positioned on the roof of a building and the conditioned air is delivered to the interior of the building. In other embodiments, portions of the system may be located within the building and a portion outside the building. The HVAC system 100 may also include heating elements that are not shown here for convenience and clarity. The HVAC system 100 of FIG. 1 is meant for illustrative purposes and not in any way to limit the claims to a single context.

The illustrative HVAC system 100 includes a working-fluid conduit subsystem 102 for moving a working fluid, or refrigerant, through a cooling cycle. The working fluid may be any acceptable working fluid, or refrigerant, including, without limitation, fluorocarbons, e.g., chlorofluorocarbons; ammonia; non-halogenated hydrocarbons (e.g., propane); hydroflurocarbons (e.g., R-410A); etc. Any suitable refrigerant may be used.

The illustrative HVAC system 100 includes a compressor 104 coupled to the working-fluid conduit subsystem 102 for compressing the working fluid. The system 100 further includes a condenser 106 downstream of the compressor 104 for rejecting heat. The condenser 106 includes a fan 108 for moving air 109 across the condenser 106. The compressed, cooled working fluid flows downstream from the condenser 106 to an expansion device 110, or metering device. The expansion device 110 is coupled to the working-fluid conduit subsystem 102 downstream of the condenser 106 and is for removing pressure from the working fluid. The expansion device 110 is closely associated with a cooling unit 112, e.g., an evaporator coil. The expansion device 110 is coupled to the working-fluid conduit subsystem 102 downstream of the condenser 106 for removing pressure from the working fluid. In this way, the working fluid is delivered to the cooling unit 112 and receives heat from airflow 114 to produce a treated airflow 116 that is delivered by a duct subsystem 118 to the desired space in the building (not shown).

A portion of the HVAC system 100 is devoted to moving air across the cooling unit 112 and into the duct sub-system 118. Return air 120, which may be air returning from the building or fresh air from outside or some combination, is pulled into a return duct 122. A suction side of a variable-speed blower 124 pulls the return air 120. The variable-speed blower 124 discharges airflow 114 into a duct 126 from where the airflow 114 crosses the cooling unit 112 or heating elements (not explicitly shown) to produce the treated airflow 116. The variable-speed blower 124 has a power cable 127 that provides power to the variable-speed blower 124. The power cable 127 may be coupled to a drive or to a processing unit 134 that controls the speed of the variable-speed blower 124.

The variable-speed blower 124 is any blower for which the speed of the blower may be controlled using various power settings such as one that may be varied substantially between two operating points. Non-limiting examples of blowers that may be used as the variable-speed blower 124 include, without limitation, the following: belt-drive blowers controlled by inverters, direct-drive blowers with electronic commuted motors (ECM), or other suitable blowers.

The HVAC system 100 further includes a blower-proving switch figuratively shown at 128. The blower-proving switch 128 considers a pressure differential between a first pressure transducer 130 at a suction side location and a second pressure transducer 132 at a discharge location. The blower-proving switch 128 is coupled to the processing unit 134 to provide a pressure differential signal. The blower-proving switch 128 may be a diaphragm-type switch or a differential pressure transducer or other suitable switch.

The processing unit 134 includes one or more processors 136 and one or more memories 138. The one or more processors 136 are configured to execute one or more sequences of instructions, programming or code stored on or in the one or more memories 138, which includes all types of memory devices and includes readable medium used for storage. The processor 136 can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network or any like suitable entity that can perform calculations or other manipulations of data. The memory 138 may include one or more the following: random access memory (RAM), flash memory, read only memory (ROM), programmable read only memory (PROM), erasable PROM, registers, hard disks, removable disks, CD-ROMS, DVDs, or any other suitable storage devices. One or more temperature sensors 140 may be communicatively coupled to the processing unit 134 as suggested at 142. The processing unit 134 may include an input 144 (e.g., touchscreen, keyboard, etc.) or output 146 (e.g., screen, speaker, email, etc.) for facilitating interaction with a user.

With respect to the operation of blowers, if one only has only one setting for a blower, i.e., it is not variable speed blower, one will make the blower operate at full speed when in use. Much of the time, however, one does not need that level of output and that results in inefficiencies. If a variable-speed blower is used, one can idle it back when the full output is not needed. This helps with efficiency. In some states of the United States, it is mandatory for larger RTUs to have variable-speed blowers for this reason. Without more, however, an issue can arise in using a variable-speed blower in that a reliable determination that some airflow is continuing may be wanting.

In buildings, particularly commercial buildings, regulations or standards require a certain amount of airflow. Yet, without more the HVAC system 100 may not be able to distinguish between no airflow and limited airflow when the variable-speed blower 124 is functioning at a low speed. This is because the static pressure in the system goes down with lower speeds. When the speed of the variable-speed blower 124 is turned down, the static pressure, e.g., at transducer 132, goes down. While not limited by theory, the static pressure is the square of the ratio of the amount that the airflow was slowed down. If one cuts half of the airflow, one cuts the static pressure by ¼ (i.e., static=(½)^2). The blower-proving switch 128 functions as a static pressure measurement device. The blower-proving switch 128 determines a pressure differential across the blower 124. An issue is that if the system 100 is sensing the static pressure differential 130, 132 and using that to determine if the system 100 is still delivering airflow, it can be very delicate on the cut back because of the pressure drop. But if there is an adequate differential pressure across the variable-speed blower 124, one may know the blower 124 is blowing, but if not, then the blower 124 is not operating properly. That is why it is called a blower-proving switch.

The blower-proving switch 128 has a making point that is associated with a static pressure differential. If the blower-proving switch 128 has tripped, even if airflow is occurring, the system 100 will indicate that no airflow is taking place. Moreover, as explained in connection with FIGS. 3 and 4, the pressure associated with the making point is greater than the pressure associated with the breaking point, or triggering point. So in the present embodiment, the variable-speed blower 124 is sped up sufficiently to raise the pressure above the making point before slowing the variable-speed blower 124 down. In this way, the blower-proving switch 128 works properly and indicates airflow. This will be explained in more detail below.

Figure 3:
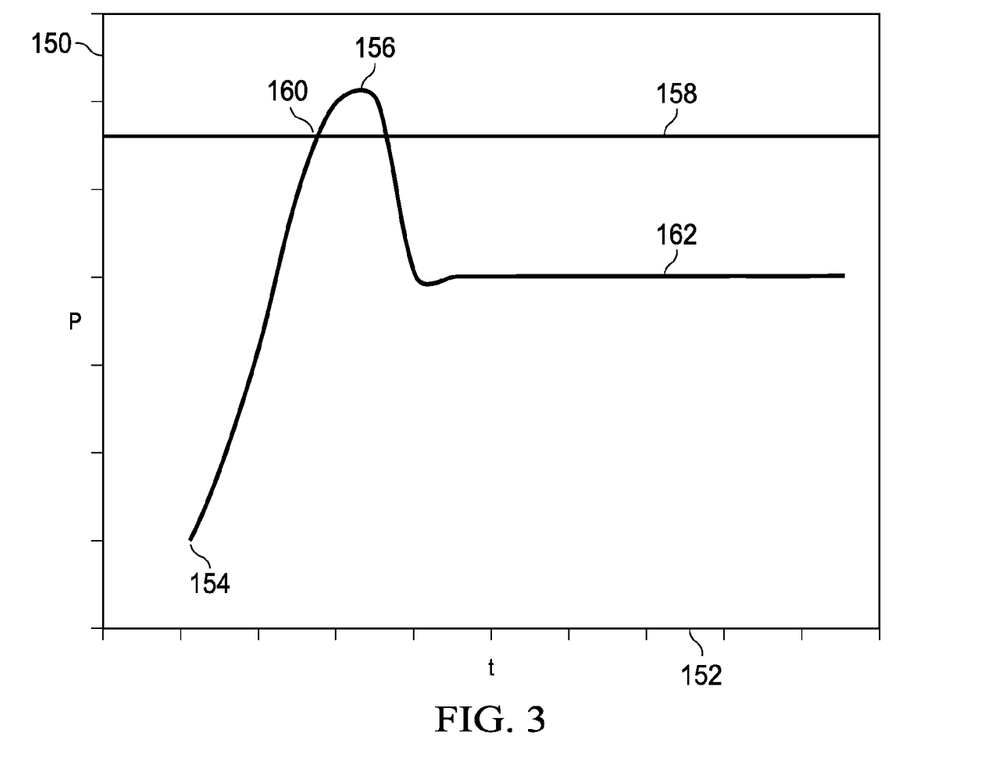
FIG. 3 is a schematic, illustrative graph of pressure-time profile for the operation of an HVAC system according to an illustrative embodiment.

Referring now primarily to FIG. 3, a schematic graph of a profile of static pressure differential, e.g., across 130, 132 (FIG. 1 or 2), versus time is presented. This static pressure is on the ordinate axis 150 and time is on the abscissa axis 152. The plot begins with a relatively low pressure at point 154 and is increased as additional energy is provided to the variable-speed blower 124 until reaching a maximum pressure 156. Between 154 and 156, the plot reaches the making point pressure 158 where it crosses at point 160. The speed of the variable-speed blower 124 may then be reduced to an operating pressure 162, which may be less than the making pressure 158, or pressure associated with the making point.

Figure 4:
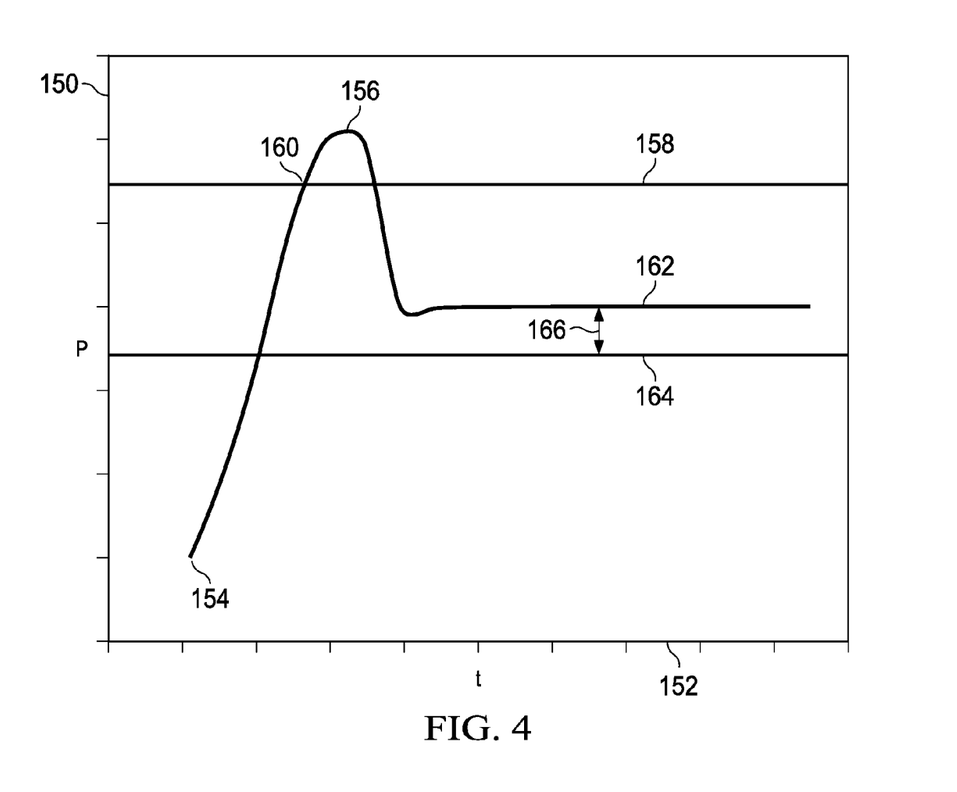
FIG. 4 is a schematic, illustrative graph of pressure-time profile for the operation of an HVAC system according to another illustrative embodiment.

Referring now primarily to FIG. 4, a schematic graph of a profile of static pressure differential, e.g., across 130, 132 (FIG. 1 or 2), versus time is presented that is analogous to FIG. 3, but a couple of additional concepts are added. As previously mentioned, the blower-proving switch 128 has a breaking point, or trigger point, that has an associated breaking point pressure 164. In normal operations, the operating pressure 162, which is associated with an operating speed or range of speeds of the variable-speed blower, is less than the making point pressure 158 and greater than the breaking point pressure 164.

In one embodiment, the processing unit 134 (FIGS. 1-2) records the making point pressure 158 and the breaking point pressure 164 during a commissioning or during a start-up routine, and then the processing unit 134 controls the power delivered by cable 127 to the blower 124 to keep the pressure in the desired range and may keep the operating pressure 162 greater than the breaking point pressure 164 by a buffer margin 166. The buffer margin 166 may be some percentage of the difference between the making point pressure 158 and the breaking point pressure 164. For example, the buffer margin 166 may be 1, 5, 10, 20, percent or any number between the stated numbers of the difference between the pressures 158 and 162.

With reference now to FIGS. 1-4, in operation, according to one illustrative embodiment, the system 100 is activated by either a user using input 144 or by automated operation responsive to time or a temperature change. The variable-speed blower 124 is initially energized sufficiently so that a static pressure differential at the blower 124 is increased at least to create the making point pressure 158. Then, the variable-speed blower 124 is decreased such that the static pressure decreases to an operating pressure 162 or range. As previously noted, in some embodiments, the processing unit 134 may record the making point pressure 158 and the breaking point pressure 164 and then control the power to the variable-speed blower 134 such that the static pressure initially goes at least to the making point pressure 158 to make sure the blower-proving switch 128 is set and then reduces the power to the variable-speed blower 134 to the operating pressure 162 while keeping the operating pressure greater than the breaking point pressure 164 by a buffer margin 166.

If the processing unit 134 causes the variable-speed blower 124 to go to a maximum power and the blower-proving switch 128 does not reset, then an error message may be presented visually, audible, or some other way. This may occur after some time interval, e.g., full power for ten seconds with no reset of the blower-proving switch 128.

There are many ways that the processing unit 134 may be configured to carry out embodiments of the present invention. An illustrative, non-limiting embodiment of a process flow is presented in FIG. 5. The process 200 begins with activating the system at 202. The processing unit 134 (FIG. 1) would then supply increasing power to the variable-speed blower 124 (FIG. 1) at step 204. At interrogatory 206, the processing unit considers whether the static pressure is greater than or equal to the making point pressure.

Figure 5:
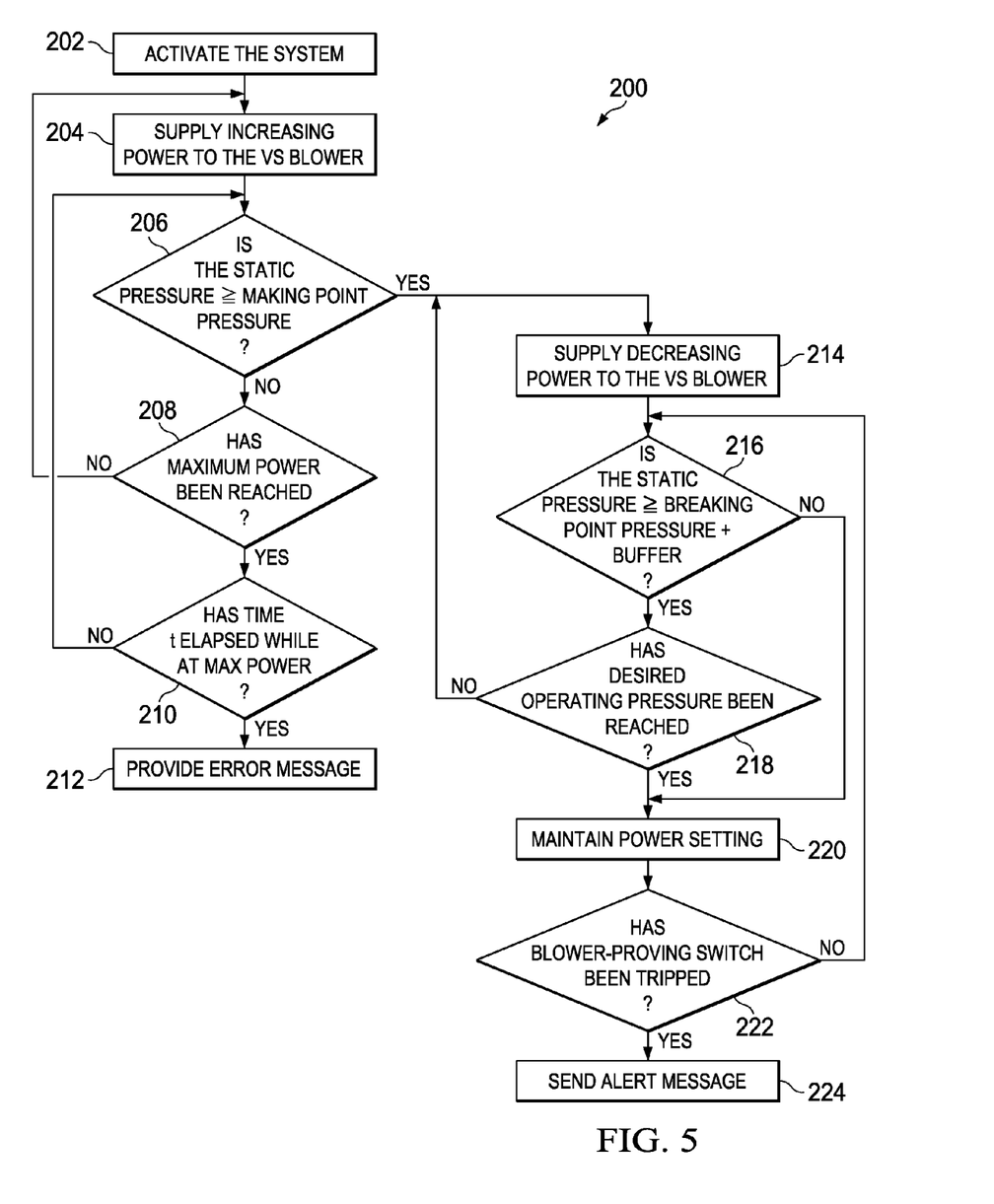
FIG. 5 is an illustrative flow chart for an aspect of a method of providing airflow to a building according to an illustrative embodiment.

If the answer to 206 is negative, interrogatory 208 is reached. That interrogatory asks whether the maximum power of the variable-speed blower has been reached. If yes, interrogatory 210 is reached. If interrogatory 208 is answered in the negative, the process returns to step 204. Interrogatory 210 asks whether or not an elapsed time t has transpired at the maximum power. If so, the processing unit assumes there is a problem and provides an error message that step 212. The error message may be provided to an output device (visual or audible) or email or other means of communication. If interrogatory 210 is negative, the process continues to 206.

If the answer to interrogatory 206 is affirmative, the blower-proving switch should have set and then the processing unit 134 (FIG. 1) begins decreasing the power to the variable-speed blower 124 (FIG. 1) at step 214. Next, interrogatory 216 is reached. Interrogatory 216 asks whether or not the static pressure differential is greater than or equal to the breaking point pressure plus a buffer margin. If so, the process continues to interrogatory 218, and if not proceeds to step 220.

Interrogatory 218 asks whether the desired operating pressure has been reached. This pressure may be established by the processing unit 134 based on the conditioning demands of the building. If the answer to interrogatory 218 is negative, the process continues again to step 214. If the answer to interrogatory 218 is positive, the process continues to step 220. At step 220 the power to the variable-speed blower 124 (FIG. 1) is maintained.

At any location and perhaps many locations (not shown), the question may be asked as to whether the blower-proving switch has been tripped. For example, this is asked at interrogatory 222. If so, an alert is sent at step 224. In this instance if the answer is negative, the process returns to interrogatory 216. This is only one illustrative example of a process flow; a person of ordinary skill in the art will understand that many processes might be used.

According to an illustrative embodiment, a method of providing airflow to a building using an HVAC system 100 includes deploying a variable-speed blower 124 for producing an airflow and coupling a blower-proving switch 128 with the variable-speed blower 124, wherein the variable-speed blower 124 has a making point and a breaking point and wherein a first pressure differential 158 is associated with the making point and is greater than a second pressure differential 164 that is associated with the breaking point. The method further includes coupling the variable-speed blower 124 and blower-proving switch 128 to a processing unit 134 and activating the variable-speed blower 124 with sufficient power such that the first pressure 158 is reached. The method also includes reducing power to the variable-speed blower 124 to an operating point having an operating pressure 162 that is less than the first pressure 158. In another embodiment, power is reduced to the variable-speed blower 124 to an operating point having an operating pressure that is less than the first pressure 158 and greater than the second pressure 164.

According to an illustrative embodiment, an HVAC system includes a variable-speed blower for producing an airflow; a blower-proving switch, wherein the blower-proving switch has a making point; and a cooling unit downstream of the variable-speed blower for cooling the airflow delivered from the variable-speed blower. The system also includes a processing unit having at least one processor and at least one memory. The processing unit is coupled to the variable-speed blower and to the blower-proving switch. The at least one processor and at least one memory are configured to perform the following steps: energize the variable-speed blower sufficiently to elevate a pressure differential across the variable-speed blower such that a first pressure associated with the making point of the blower-proving switch is at least reached, and reduce the variable-speed blower to an operating speed associated with an operating pressure that is less than the first pressure.

It will be apparent that the systems and methods contemplated herein, among other things, allow for the efficient use of a variable-speed while making sure that a blower-proving switch works properly thereby confirming airflow to the building.

Unless otherwise specified, any use of any form of the terms "connect," "engage," "couple," "attach," or any other term describing an interaction between elements is not meant to limit the interaction to direct interaction between the elements and may also include indirect interaction between the elements described. Coupling includes in some instances communicatively coupled, which may be a wireless connection or a wired connection. Coupled in some instances may refer to fluid coupling. In the discussion herein and in the claims, the terms "including" and "comprising" are used in an open-ended fashion, and thus should be interpreted to mean "including, but not limited to . . . ."

It will be understood that the benefits and advantages described above may relate to one embodiment or may relate to several embodiments. It will further be understood that reference to "an" item refers to one or more of those items.

The steps of the methods described herein may be carried out in any suitable order, or simultaneously where appropriate.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed:

1. A method of providing airflow to a building using an HVAC system, the method comprising:
    deploying a variable-speed blower for producing an airflow;
    coupling a blower-proving switch with the variable-speed blower, wherein the blower-proving switch has a making point and a breaking point and wherein a first pressure is associated with the making point and which is greater than a second pressure that is associated with the breaking point;
    coupling the variable-speed blower and blower-proving switch to a processing unit;
    activating the variable-speed blower with sufficient power such that the first pressure is reached; and reducing power to the variable-speed blower to an operating point having an operating pressure that is less than the first pressure.

2. The method of claim 1, wherein the step of reducing power to the variable-speed blower comprises reducing power to the variable-speed blower to an operating point having an operating pressure that is less than the first pressure and greater than the second pressure.

3. The method of claim 1, wherein the step of reducing power to the variable-speed blower comprises reducing power to the variable-speed blower to an operating point having an operating pressure that is less than the first pressure and greater than the second pressure by at least a buffer margin.

4. The method of claim 1, wherein the step of reducing power to the variable-speed blower comprises reducing power to the variable-speed blower to an operating point having an operating pressure that is less than the first pressure and greater than the second pressure by at least five percent of the difference between the first pressure and the second pressure.

5. The method of claim 1, wherein the step of reducing power to the variable-speed blower comprises reducing power to the variable-speed blower to an operating point having an operating pressure that is less than the first pressure and greater than the second pressure by at least 10 percent of the difference between the first pressure and the second pressure.

6. The method of claim 1, further comprising: delivering airflow from the blower to a cooling unit and into a duct sub-system.

7. The method of claim 1, further comprising initially running the variable speed blower to maximum and recording the first pressure in a processing unit and reducing the variable speed blower at least until reaching the breaking point and recording the second pressure in the processing unit.

8. A heating, ventilating, and air conditioning system comprising:
   a variable-speed blower for producing an airflow;
   a blower-proving switch, wherein the blower-proving switch has a making point;
   a cooling unit downstream of the variable-speed blower for cooling the airflow delivered from the variable-speed blower; and
   a processing unit having at least one processor and at least one memory, the processing unit coupled to the variable-speed blower and to the blower-proving switch, wherein the at least one processor and at least one memory are configured to perform the following steps:
   (i) energize the variable-speed blower sufficiently to elevate a pressure differential across the variable-speed blower such that a first pressure associated with the making point of the blower-proving switch is at least reached, and
   (ii) reduce the variable-speed blower to an operating speed associated with an operating pressure that is less than the first pressure.

9. The system of claim 8, wherein the blower-proving switch has a breaking point, and wherein the at least one processor and at least one memory are further configured to perform the following step: maintain the operating pressure above a second pressure associated with the breaking point of the blower-proving switch.

10. The system of claim 8, wherein the blower-proving switch has a breaking point, and wherein the at least one processor and at least one memory are further configured to perform the following step: maintain the operating pressure above a second pressure associated with the breaking point of the blower-proving switch by at least a buffer margin.

11. The system of claim 8, wherein the blower-proving switch has a breaking point, and wherein the at least one processor and at least one memory are further configured to perform the following step: maintain the operating pressure above a second pressure associated with the breaking point of the blower-proving switch by at least a buffer margin of five percent.

12. The system of claim 8, wherein the blower-proving switch has a breaking point, and wherein the at least one processor and at least one memory are further configured to perform the following step: maintain the operating pressure above a second pressure associated with the breaking point of the blower-proving switch by at least a buffer margin of ten percent.

13. The system of claim 8, wherein the blower-proving switch is a diaphragm-type switch.

14. The system of claim 8, further comprising:
   a duct sub-system for receiving the airflow from the variable-speed blower and delivering the airflow to a portion of a building;
   a working-fluid conduit subsystem forming a closed conduit for circulating a working fluid;
   a compressor coupled to the working-fluid conduit subsystem for compressing the working fluid;
   a condenser coupled to the working-fluid conduit subsystem downstream of the compressor for rejecting heat;
   an expansion device coupled to the working-fluid conduit subsystem downstream of the condenser for removing pressure from the working fluid; and
   wherein the working fluid is delivered from the expansion valve to the cooling unit.

* * * * *